US009260788B2

(12) United States Patent
Lin et al.

(10) Patent No.: US 9,260,788 B2
(45) Date of Patent: Feb. 16, 2016

(54) REINFORCED ARTICLES AND METHODS OF MAKING THE SAME

(71) Applicant: General Electric Company, Schenectady, NY (US)

(72) Inventors: Dechao Lin, Greer, SC (US); Ganjiang Feng, Greenville, SC (US); Srikanth Chandrudu Kottilingam, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 345 days.

(21) Appl. No.: 13/664,123

(22) Filed: Oct. 30, 2012

(65) Prior Publication Data

US 2014/0120308 A1 May 1, 2014

(51) Int. Cl.
*B05D 1/36* (2006.01)
*B05D 3/06* (2006.01)
(Continued)

(52) U.S. Cl.
CPC .............. *C23C 28/3455* (2013.01); *B23H 9/10* (2013.01); *B23K 9/013* (2013.01); *B23K 9/04* (2013.01); *C23C 28/3215* (2013.01); *F01D 5/282* (2013.01); *F01D 5/284* (2013.01); *F01D 5/288* (2013.01); *Y10T 428/24322* (2013.01)

(58) Field of Classification Search
CPC .............. B23H 1/00; B23H 5/00; B23H 9/00; B23H 9/001; B23H 9/06; B23H 9/10; B23H 9/14; B23K 9/013; B23K 9/04; B23K 9/042; B23K 9/044; B23K 9/046; B23K 9/048; B23K 9/18–9/188; B23K 9/235; B23K 10/00; B23K 10/003; B23K 10/02; B23K 10/027; C23C 14/00; C23C 28/00–28/34; C23C 28/345–28/36; F02C 7/00; F02C 7/04; F02C 7/05; F02C 7/12; F02W 2746/00138; F02W 2746/00144
USPC ......... 427/450, 480, 142, 448, 451, 452, 453, 427/454, 456, 563, 564, 576, 578, 579, 427/140; 219/69.1–70, 73.1–76.1, 219/76.12–76.16; 29/889–889.722
See application file for complete search history.

(56) References Cited

U.S. PATENT DOCUMENTS 5,723,078 A * 3/1998 Nagaraj et al. ............. 264/36.18
6,329,015 B1 * 12/2001 Fehrenbach et al. .......... 427/142
(Continued)

FOREIGN PATENT DOCUMENTS

EP 001864742 A1 * 12/2007 ............... B23H 9/10

OTHER PUBLICATIONS

Kansel et al., "Technology and research developments in powder mixed electric discharge machining (PMEDM)"; Journal of Materials Processing Technology, vol. 184 (2007, no month), pp. 32-41.*
(Continued)

*Primary Examiner* — Marianne L Padgett
(74) *Attorney, Agent, or Firm* — Dority & Manning, PA

(57) ABSTRACT

An article comprising a substrate; a bond layer disposed on the substrate, the bond layer comprising one or more bonding segments and at least one reinforcing segment; at least one protective layer disposed on the bond layer; and at least one cooling hole extending through the substrate, the at least one reinforcing segment and the at least one protective layer, wherein the at least one reinforcing segment reduces cracking and/or delamination at the interface between the substrate and the bond layer, and methods of making the same.

8 Claims, 1 Drawing Sheet

10

60 50 50 60
70
40 { 30
20
80

(51) Int. Cl.

| | |
|---|---|
| ***C23C 28/00*** | (2006.01) |
| ***B23K 9/04*** | (2006.01) |
| ***B23K 9/013*** | (2006.01) |
| ***B23H 9/10*** | (2006.01) |
| *B05D 1/38* | (2006.01) |
| *F01D 5/28* | (2006.01) |

(56) References Cited

U.S. PATENT DOCUMENTS

| | | | | |
|---|---|---|---|---|
| 6,609,894 | B2 * | 8/2003 | Mukira et al. | 416/224 |
| 6,835,908 | B2 * | 12/2004 | Bailey | C23C 26/00 219/76.13 |
| 7,509,735 | B2 * | 3/2009 | Philip et al. | 29/889.1 |
| 8,921,730 | B2 * | 12/2014 | Cui et al. | 219/76.12 |
| 8,974,865 | B2 * | 3/2015 | Lin | B23K 9/04 228/119 |
| 8,987,629 | B2 * | 3/2015 | Cui | B23K 10/027 219/121.13 |
| 9,162,306 | B2 * | 10/2015 | Lin | B23K 9/048 |
| 9,168,606 | B2 * | 10/2015 | Lin | B23K 9/04 |
| 2003/0165621 | A1 * | 9/2003 | Farmer | B23P 6/002 427/331 |
| 2004/0182826 | A1 * | 9/2004 | Bailey | C23C 26/00 219/76.13 |
| 2005/0235493 | A1 * | 10/2005 | Philip et al. | 29/889.1 |
| 2006/0016191 | A1 * | 1/2006 | Woodcock et al. | 60/754 |
| 2006/0275553 | A1 * | 12/2006 | Subramanian | 427/421.1 |
| 2007/0202269 | A1 * | 8/2007 | Potter et al. | 427/446 |
| 2008/0113163 | A1 * | 5/2008 | Schlichting | C23C 4/005 428/209 |
| 2008/0298975 | A1 | 12/2008 | James et al. | |
| 2010/0236067 | A1 * | 9/2010 | Hu et al. | 29/889.1 |
| 2011/0143164 | A1 * | 6/2011 | Cetel | C22C 19/056 428/680 |
| 2012/0164376 | A1 * | 6/2012 | Bunker et al. | 428/131 |
| 2012/0214019 | A1 * | 8/2012 | Lin et al. | 428/615 |
| 2013/0309418 | A1 * | 11/2013 | Lin et al. | 427/580 |
| 2014/0027410 | A1 * | 1/2014 | Lin et al. | 219/76.13 |
| 2014/0030497 | A1 * | 1/2014 | Tryon | C23C 28/3215 428/215 |
| 2014/0042128 | A1 * | 2/2014 | Feng et al. | 219/69.17 |
| 2014/0050938 | A1 * | 2/2014 | Lin et al. | 428/596 |
| 2014/0065320 | A1 * | 3/2014 | Lin et al. | 427/554 |
| 2014/0138358 | A1 * | 5/2014 | Lin et al. | 219/74 |
| 2015/0086408 | A1 * | 3/2015 | Kottilingam | B22F 5/04 419/5 |
| 2015/0140239 | A1 * | 5/2015 | Reid | B23K 9/044 428/34.1 |
| 2015/0159254 | A1 * | 6/2015 | Reid | C23C 4/005 428/137 |

OTHER PUBLICATIONS

"FAQ: What is electrospark deposition (ESD)?"; Printed from online on Aug. 24, 2015 from www.twi-global.com/technical-knowledge/faqs/process-faqs/faq-what-is-electrospark; one page.*

"Glossary" from MetalTek International's online website at www.metaltek.com/resources/library/glossary; retrieved entries on "metallurgical bond" & "metallurgy" on Aug. 24, 2015, printed onto pages.*

"Metallurgical bond"; Engineering Dictionary-EngNet, printed from online Aug. 24, 2015 from www.engnetglobal.com/tips/glossary.aspx?word=Metallurgical+Bond", one page.*

"Anatomy of a metallurgical bond"; Engineering Materials Solutions, retrieved Aug. 24, 2015 from www.emsclad.com/5-anatomy.html; one page.*

"Metallurgical bonding" & "metallurgical", from ENCYCLO.CO.UK English Encyclopedia, found at www.encyclo.co.uk on Aug. 24, 2015 three page excerpt.*

Voisey, K.T., et al.; "Damage Cuased During Laser Drilling of Thermal Spray TBCs on Superallow Substrates"; Department of Materials Science of Metallurgy University of Cambridge; Cambridge, UK, no date, oldest citation is dated 2000.

"Thermal Barrier Coatings"; pp. 6-19; Chapter 2. title of chapter from unknown book, by unknown author & unknown publication date.

Lee, Kang N; "Protective Coastings for Gas Turbines"; Cleveland State University NASA Glenn Research Center Cleveland, OH 44135; pp. 419-437. title is of chapter 4.4.2 from unspecified publication source & no publication date provided.

J. Kamalu, et al., "Variable Angle Laser Drilling of Thermal Barrier Coated Nimonic," Journal of Materials Processing Technology 122 (2002); pp. 355-362.

C. A. McNally, et al., "Laser Drilling of Cooling Holes in Aeroengines: State of the Art and Future Challenges," Materials and Sciences and Technology (Jul. 2004); vol. 20; pp. 805-813.

H. K. Sezer, et al., "Non-Destructive Microwave Evaluation of TBC Delaminaton Induced by Acute Angle Laser Drilling," Measurement Science and Technology vol. 18 (2007); pp. 167-175.

K. T. Voisey, et al., "Laser Drilling of Cooling Holes Through Plasma Sprayed Thermal Barrier Coatings," Elsevier Sciences Surface and Coatings Technology; pp. 296-306, vol. 176; (2004, no month); copright 2003.

H. K. Sezer, et al., "Effect of Beam Angle on HAZ, Recast and Oxide Layer Characteristics in Laser Drilling of TBC Nickel Superalloys," International Journal of Machine Tools & Manufacture 46 (2006); pp. 1972-1982.

H. K. Sezer, et al., "Mechanisms of Acute Angle Laser Drilling Induced Thermal Barrier Coating Delamination," Journal of Manufacturing Science and Engineering (Oct. 2009); pp. 051014-1-6, vol. 131.

* cited by examiner

10

10

REINFORCED ARTICLES AND METHODS OF MAKING THE SAME

BACKGROUND OF THE INVENTION

The subject matter disclosed herein relates to reinforced articles, such as gas turbine engine components, and more particularly to reinforced articles which are resistant to cracking and/or delamination, and methods of making the same.

Gas turbine engines accelerate gases, forcing the gases into a combustion chamber where heat is added to increase the volume of the gases. The expanded gases are then directed toward a turbine to extract the energy generated by the expanded gases. In order to endure the high temperatures and extreme operating conditions in gas turbine engines, gas turbine engine components, such as turbine blades, are fabricated from metal, ceramic or ceramic matrix composite materials.

Thermal barrier coatings are applied to the surface of gas turbine engine components to provide added protection and to thermally insulate the gas turbine engine components during operation of the gas turbine engine at high temperatures. A thermal barrier coating has at least one protective layer and a bond layer. The at least one protective layer is applied to a substrate, such as a gas turbine engine component, via the bond layer. The protective layer is a ceramic material and can include multiple layers.

Cooling holes are incorporated into gas turbine engine components in order to allow for more efficient operation at higher operating temperatures. Cooling holes are drilled into the gas turbine engine component, for example, using laser drilling. In gas turbine engine components having a thermal barrier coating, the cooling holes extend through the at least one protective layer, the bond layer and the substrate of the gas turbine engine component.

During operation of the gas turbine engine, the areas surrounding these cooling holes undergo cracking and/or delamination. The process of drilling the cooling holes results in degradation at the interface between the bond layer and the substrate and/or the bond layer and the at least one protective layer. In addition, the hot gas environment in gas turbine engines results in oxidation of the bond layer and formation of a thermally grown oxide (TGO) layer. The TGO layer creeps into the at least one protective layer as a result of shear stress due to, for example, centrifugal load or mismatch of thermal expansion between adjacent layers or between a layer and the substrate. The formation and creep of the TGO layer causes cracking and/or delamination at the interface between the substrate and the bond layer and/or at the interface between the bond layer and the at least one protective layer, thereby increasing the frequency of repairs and/or reducing the overall lifetime of the component.

It is therefore desirable to provide reinforced articles having improved cracking and/or delamination resistance, and methods of making the same, which solve one or more of the aforementioned problems.

BRIEF DESCRIPTION OF THE INVENTION

According to one aspect of the invention, an article comprises a substrate; a bond layer disposed on the substrate, the bond layer comprising one or more bonding segments and at least one reinforcing segment; at least one protective layer disposed on the bond layer; and a cooling hole extending through the substrate, the at least one reinforcing segment and the at least one protective layer, wherein the at least one reinforcing segment reduces cracking and/or delamination at the interface between the substrate and the bond layer.

According to another aspect of the invention, a method comprises providing a substrate, the substrate having a surface; forming one or more bonding segments on one or more portions of the surface of the substrate, forming at least one reinforcing segment on a portion of the surface of the substrate, the at least one reinforcing segment being formed on the surface of the substrate by electrospark deposition, wherein the one or more bonding segments and the at least one reinforcing segment form a bond layer; forming at least one protective layer on the bond layer, forming at least one cooling hole, the at least one cooling hole extending through the substrate, the at least one reinforcing segment and the at least one protective layer, wherein the at least one reinforcing segment reduces cracking and/or delamination at the interface between the substrate and the bond layer.

These and other advantages and features will become more apparent from the following description taken together in conjunction with the accompanying drawings.

BRIEF DESCRIPTION OF THE DRAWINGS

The subject matter, which is regarded as the invention, is particularly pointed out and distinctly claimed in the claims at the conclusion of the specification.

The foregoing and other features, and advantages of the invention are apparent from the following detailed description taken in conjunction with the accompanying drawings in which.

The detailed description explains embodiments of the invention, together with advantages and features, by way of example with reference to the drawings.

DETAILED DESCRIPTION OF THE INVENTION

Embodiments described herein generally relate to reinforced articles and methods of making the same. A reinforcing segment is provided for use in a bond layer, in conjunction with a substrate and a protective layer.

Figure 1:
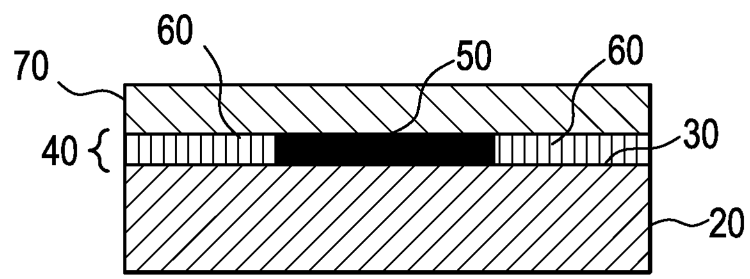
FIG. 1 is a partial cross-sectional view of an article.

Referring to FIG. 1, an article 10 comprises a substrate 20 having a surface 30. A bond layer 40 is disposed on the surface 30 of the substrate 20. The bond layer 40 comprises at least one reinforcing segment 50 and one or more bonding segments 60. At least one protective layer 70 is disposed on the bond layer 40.

The substrate 20 is a metal, metal alloy, ceramic, or ceramic matrix composite (CMC) material. In one embodiment, the substrate 20 is a gas turbine engine component. In another embodiment, the substrate is a turbine blade, vane, shroud, liner, combustor, transition piece, rotor component, exhaust flap, seal or fuel nozzle. In yet another embodiment, the substrate 20 is a turbine blade formed using a CMC material.

In one embodiment, the substrate 20 is a new substrate which has not previously been in operation in an application. In another embodiment, the substrate 20 is a used substrate, which has previously been in operation in an application. The at least one reinforcing segment 50 is used to repair the used substrate 20 by replacing at least a portion of an existing coating on the used substrate.

The bond layer 40 assists in bonding the at least one protective layer 70 to the surface 30 of the substrate 20. In one embodiment, the at least one reinforcing segment 50 and the one or more bonding segments 60, cumulatively, constitute a continuous bond layer 40.

In one embodiment, the at least one reinforcing segment 50 and/or the one or more bonding segments 60 of the bond layer 40 comprise silicon, cobalt, nickel, chromium, aluminum, yttrium or a combination comprising at least one of the foregoing. In another embodiment, the at least one reinforcing segment 50 is formed using a material which is also used to form the one or more bonding segments 60. In yet another embodiment, the at least one reinforcing segment 50 and/or the one or more bonding segments 60 have the same or substantially the same coefficients of thermal expansion (CTE). In still another embodiment, the at least one reinforcing segment 50 is formed using a material which is different from a material used to form the one or more bonding segments 60.

In one embodiment, the one or more bonding segments 60 are formed by first forming a continuous layer (not shown) on the surface 30 of the substrate 20. The continuous layer is formed using thermal spraying, plasma spraying, atmospheric plasma spray (APS), chemical vapor deposition (CVD), plasma enhanced CVD (PECVD), dip coating, spin coating, electro-phoretic deposition (EPD) or electrospark deposition (ESD). In a particular aspect of the embodiment, the continuous layer is formed using thermal spraying. At least one portion of the continuous layer is removed. The at least one portion of the continuous layer is removed using any suitable removal technique, including but not limited to, mechanical removal, chemical removal or burning off the at least one portion of the continuous layer using electrosparks. The remaining portion or portions of the continuous layer form the one or more bonding segments 60 of the bond layer 40.

In another embodiment, the one or more bonding segments 60 are formed separately in a discontinuous layer wherein each of the one or more bonding segments 60 is formed on a different portion of the surface 30 of the substrate 20. The one or more bonding segments 60 are formed using thermal spraying, plasma spraying, atmospheric plasma spray (APS), chemical vapor deposition (CVD), plasma enhanced CVD (PECVD), dip coating, spin coating, electro-phoretic deposition (EPD) or electrospark deposition (ESD). In a particular aspect of the embodiment, the one or more bonding segments 60 is formed using thermal spraying.

The at least one reinforcing segment 50 is deposited onto a portion of the surface 30 of the substrate 20 using electrospark deposition (ESD). ESD is a pulse micro-welding method having an implied millisecond duration thermal cycle at temperatures between about 8,000° C. to about 25,000° C. Using ESD, the at least one reinforcing segment 50 is applied to a portion of a surface 30 of the substrate 20 via electric sparks. Both the deposition and the cooling, or self-quenching, of the at least one reinforcing segment 50 are rapid. Due to the short duration of the thermal pulses, the surface 30 of the substrate 20 is subjected to only low heat input during the ESD process. The microstructure of the surface 30 of the substrate 20 following deposition of the at least one reinforcing segment 50 using ESD is the same or substantially the same as the microstructure of the surface 30 of the substrate 20 before deposition of the at least one reinforcing segment 50 on the surface 30 of the substrate 20.

Deposition of the at least one reinforcing segment 50 via ESD results in the formation of a metallurgical bond between the at least one reinforcing segment 50 and the substrate 20. In one embodiment, electrosparks are used to remove at least a portion of an existing coating to form the one or more bonding segments 60 while simultaneously using electrosparks to deposit the at least one reinforcing segment 50.

The at least one reinforcing segment 50 is built up to a desired thickness by repeatedly overlaying deposits of the at least one reinforcing segment 50 material. Each of the deposits which cumulatively form the at least one reinforcing segment 50 has a substantially uniform or uniform thickness. Each of the deposits which cumulatively form the at least one reinforcing segment 50 has an average thickness of about 1 μm to about 5 μm. The resulting at least one reinforcing segment 50 has an average thickness of about 1 μm to about 500 μm. In one embodiment, the average thickness of the at least one reinforcing segment 50 and/or the one or more bonding segments 60 is uniform or substantially uniform.

The at least one reinforcing segment 50 is formed on a portion of the surface 30 of the substrate 20 which is adjacent to the one or more bonding segments 60. The at least reinforcing segment 50 and the one or more bonding segments 60 form a bond layer 40 which is continuous with the surface 30 of the substrate 20. In one embodiment, the at least one reinforcing segment 50 is formed using ESD and the one or more bonding segments 60 are formed using thermal spraying. In another embodiment, the one or more bonding segments 60 and the at least one reinforcing segment 50 are formed using ESD.

The at least one protective layer 70 protects the substrate from the effects of environmental conditions to which the article 10 is subjected during operation such as hot gas, water vapor and/or oxygen. The at least one protective layer 70 is any material suitable to protect the substrate 20 from being contacted with hot gas, water vapor and/or oxygen when the article 10 is in operation. In one embodiment, the at least one protective layer 70 comprises a ceramic material. In another embodiment, the at least one protective layer 70 comprises silicon, zirconium, an oxide of one of the foregoing or a combination comprising at least one of the foregoing.

In one embodiment, the protective layer 70 comprises a single layer. In another embodiment, the bond layer 40 and the at least one protective layer 70 form a thermal barrier coating. In yet another embodiment, the at least one protective layer 70 comprises multiple layers of various materials. In still another embodiment, the article 10 further comprises an intermediate layer (not shown) disposed between the bond layer 40 and the at least one protective layer 70, forming an environmental barrier coating (EBC).

The at least one protective layer 70 is disposed on the bond layer 40 using any suitable method, including but not limited to, atmospheric plasma spray (APS), chemical vapor deposition (CVD), plasma enhanced CVD (PECVD), dip coating, spin coating, electro-phoretic deposition (EPD) or electrospark deposition (ESD).

Figure 2:
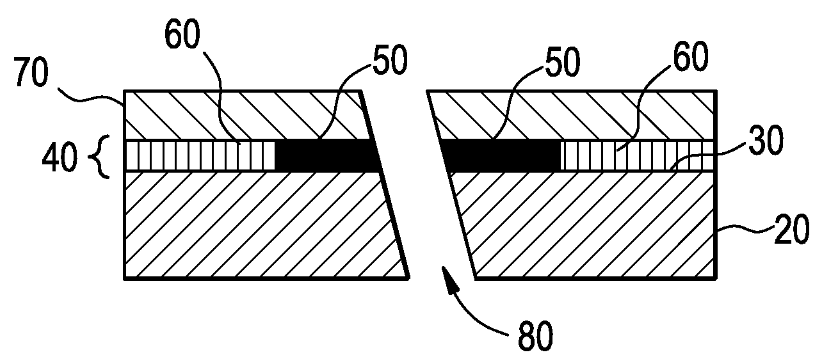
FIG. 2 is a partial cross-sectional view of another article.

The at least one reinforcing segment 50 corresponds to a location in the article 10 where at least one cooling hole is to be formed. Referring to FIG. 2, at least one cooling hole 80 is formed in the article 10. The at least one cooling hole 80 extends through the substrate 20, the reinforcing segment 50 and the at least one protective layer 70. The at least one cooling hole 80 is formed in the article 10 using any suitable method, including but not limited to, laser drilling or electric discharge machining (EDM).

The at least one cooling hole 80 is drilled through the article 10 at any desired angle. In one embodiment, the at least one cooling hole 80 is perpendicular or substantially perpendicular to the surface 30 of the substrate 20. In another embodiment, the at least one cooling hole 80 is at angle of inclination which is not perpendicular or substantially perpendicular to the surface 30 of the substrate 20. In yet another embodiment, the at least one cooling hole 80 is at an angle of inclination which is equal to or less than about 60° relative to the surface 30 of the substrate 20. In still another embodiment, the at least one cooling hole 80 is at an angle of inclination which is equal to or less than about 45° relative to the surface 30 of the substrate 20. In yet another embodiment, the at least one cooling hole 80 is at an angle of inclination which is equal to or less than about 30° relative to the surface 30 of the substrate 20.

In one embodiment, the bond layer 40 comprises a plurality of reinforcing segments 50, a plurality of cooling holes 80 and a plurality of bonding segments 60 (not shown). The number of cooling holes 80 may be selected based on the desired application and/or cooling properties.

The at least one reinforcing segment 50 reinforces the bond layer 40 during the drilling process to form the cooling hole 80. In one embodiment, the reinforcing segment 50 reduces degradation of the interface between the bond layer 40 and the substrate 20 and/or the interface between the bond layer 40 and the at least one protective layer 70 during the drilling process.

In one embodiment, the at least one reinforcing segment 50 reduces or inhibits the formation of thermally grown oxide generated at the bond layer 40. During the operation of the article 10 at high temperatures, exposure to hot gases, water vapor and/or oxygen results in oxidation of the bond layer 40. Upon melting and oxidation, the bond layer 40 forms a viscous fluid layer (not shown), such as a viscous glass layer between the bond layer 40 and the at least one protective layer 70. The viscous fluid layer comprises thermally grown oxide (TGO). The viscous fluid layer moves, or slides, under shear stress caused by centrifugal load applied to the article 10 during operation and/or a mismatch of the coefficients of thermal expansion (CTE) with the bond layer 40, the substrate 20 and/or the at least one protective layer 70. This phenomenon is referred to as "creep".

In another embodiment, the at least one reinforcing segment 50 reduces or inhibits cracking and/or delamination in the article 10. The formation of the TGO layer and/or creep results in cracking and/or delamination of the interface between the bond layer 40 and the surface 30 of the substrate 20 and/or the interface between the bond layer 40 and the at least one protective layer 70, reducing the overall lifetime of the article 10 and/or increasing the frequency of repairs. The at least one reinforcing segment 50 forms a metallurgical bond with the surface 30 of the substrate 20 upon deposition of the reinforcing segment 50 using electrospark deposition. The metallurgical bond between the at least one reinforcing segment 50 and the substrate 20 increases the bonding strength of the bond layer 40 to the substrate 20. The metallurgic bond formed by the reinforcing segment 50 reinforces the bond layer 40 locally where the at least one cooling hole 80 is drilled.

During the operation of the article 10, contact between hot gas flowing through the at least one cooling hole 80 and the at least one reinforcing segment 50 of the bond layer 40 is reduced or inhibited, increasing the oxidation resistance of the bond layer 40 and reducing or inhibiting the amount of thermally grown oxide generated at the bond layer 40. The at least one reinforcing segment 50 therefore reduces or inhibits cracking and/or delamination at the interface between the bond layer 40 and the substrate 20 or at the interface between the bond layer 40 and the at least one protective layer 70. The reinforcing segment 50 also assists in bonding, or adhering, the bond layer 40 to the surface 30 of the substrate 20. In one embodiment, the interface between the at least one reinforcing segment 50 and the substrate 20 and/or the interface between the reinforcing segment 50 and the at least one protective layer 70 is crack-free.

In addition, when the at least one cooling hole 80 is drilled at angle of inclination which is not perpendicular or substantially perpendicular to the surface 30 of the substrate 20, the at least one cooling hole 80 undercuts the interface between the bond layer 40 and the substrate 20 and the bond layer 40 and the at least one protective layer 70. This undercutting promotes the growth rate of the TGO layer and cracking at the interface between the bond layer 40 and the at least one protective layer 70. The at least one reinforcing segment 50 reduces cracking and/or delamination at the interface between the bond layer 40 and the substrate 20 and/or the interface between the bond layer 40 and the at least one protective layer 70 wherein the at least one cooling hole 80 is drilled perpendicular or substantially perpendicular to the surface 30 of the substrate 20 or at an angle of inclination which is not perpendicular or substantially perpendicular to the surface 30 of the substrate 20.

The at least one reinforcing segment 50 provides improved crack resistance, delamination resistance, oxidation resistance, creep resistance and/or temperature resistance, thereby improving the performance and overall lifetime of the article 10 and/or increasing the time interval between repairs.

In one embodiment, a method comprises providing a substrate 20, the substrate having a surface 30; forming one or more bonding segments 60 on a portion of the surface 30 of the substrate 20, forming at least one reinforcing segment 50 on a portion of the surface 30 of the substrate 20, the at least one reinforcing segment 50 being formed on the surface 30 of the substrate 20 by electrospark deposition, wherein the one or more bonding segments 60 and the at least one reinforcing segment 50 form a bond layer 40; forming at least one protective layer 70 on the bond layer 40, forming at least one cooling hole 80, the at least one cooling hole 80 extending through the substrate 20, the at least one reinforcing segment 50 and the at least one protective layer 70, wherein the at least one reinforcing segment 50 reduces cracking and/or delamination at the interface between the substrate 20 and the bond layer 40.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method comprising:

providing a substrate, the substrate having a surface;

forming one or more bonding segments on one or more portions of the surface of the substrate, forming at least one reinforcing segment on a portion of the surface of the substrate, the at least one reinforcing segment being formed on the surface of the substrate by electrospark deposition, wherein the one or more bonding segments and the at least one reinforcing segment form a bond layer;

forming at least one protective layer on the bond layer, forming at least one cooling hole, the at least one cooling hole extending through the substrate, the at least one reinforcing segment and the at least one protective layer, wherein forming the one or more bonding segments comprises forming a continuous layer on the surface of the substrate and removing at least one portion of the continuous layer simultaneously with forming the at least one reinforcing segment.

2. The method of claim 1, wherein the substrate comprises a metal, a metal alloy, a ceramic or a ceramic matrix composite.

3. The method of claim 1, wherein the at least one reinforcing segment and the one or more bonding segments have the same or substantially the same coefficient of thermal expansion.

4. The method of claim 1, wherein the at least one reinforcing segment is formed using a material which is also used to form the one or more bonding segments.

5. The method of claim 1, wherein the at least one cooling hole is disposed at an angle of inclination which is not perpendicular or substantially perpendicular to the surface of the substrate.

6. The method of claim 1, wherein the at least one protective layer comprises at least two layers.

7. The method of claim 1, wherein the substrate is a gas turbine engine component.

8. The method of claim 1, wherein the substrate is a turbine blade, a turbine vane, a turbine shroud, a turbine liner, a turbine combustor, a turbine transition piece, a turbine rotor component, a turbine exhaust flap, a turbine seal or a turbine fuel nozzle.

* * * * *